United States Patent
Digiulian

(10) Patent No.: US 9,769,548 B2
(45) Date of Patent: Sep. 19, 2017

(54) WIRELESS DEVICE FOR CAPTURING STRANDED DATA ON FIELD DEVICES

(71) Applicant: Honeywell International Inc., Morristown, NJ (US)

(72) Inventor: Anthony F. Digiulian, Chalfont, PA (US)

(73) Assignee: Honeywell International Inc., Morris Plains, NJ (US)

( * ) Notice: Subject to any disclaimer, the term of this patent is extended or adjusted under 35 U.S.C. 154(b) by 35 days.

(21) Appl. No.: 14/800,293

(22) Filed: Jul. 15, 2015

(65) Prior Publication Data

US 2017/0019721 A1    Jan. 19, 2017

(51) Int. Cl.
*G08C 19/22* (2006.01)
*H04Q 9/00* (2006.01)

(52) U.S. Cl.
CPC ........... *H04Q 9/00* (2013.01); *H04Q 2209/40* (2013.01)

(58) Field of Classification Search
None
See application file for complete search history.

(56) References Cited

U.S. PATENT DOCUMENTS

| | | | | |
|---|---|---|---|---|
| 6,421,571 B1 * | 7/2002 | Spriggs | ................. | G05B 15/02 345/629 |
| 2003/0074489 A1 * | 4/2003 | Steger | .................... | G01D 9/005 710/1 |
| 2009/0081957 A1 * | 3/2009 | Sinreich | ................. | G05B 15/02 455/68 |
| 2010/0145476 A1 * | 6/2010 | Junk | .................... | G05B 19/042 700/7 |
| 2013/0151020 A1 * | 6/2013 | Manninen | ........... | F16K 37/0091 700/282 |
| 2013/0250845 A1 * | 9/2013 | Greene | .................... | H04Q 9/00 370/315 |
| 2015/0088279 A1 * | 3/2015 | Miller | .................... | G01D 18/00 700/55 |
| 2015/0127876 A1 * | 5/2015 | Erni | ................... | G05B 19/4185 710/315 |
| 2016/0092386 A1 * | 3/2016 | Sakamoto | ............ | G06F 13/387 710/106 |

OTHER PUBLICATIONS

Honeywell Process Solutions, "OneWireless Adapter for HART Devices Specifications," Model: OWA 100, 34-XY-03-43, Jun. 2011, 8 pages, publisher Honeywell International Inc., Phoenix, Arizona.

(Continued)

*Primary Examiner* — George Bugg
*Assistant Examiner* — Renee Dorsey

(57) ABSTRACT

A method includes coupling an adapter device to a field instrument in an industrial control system to provide a wireless communication capability to the field instrument. The method also includes connecting a first wire and a second wire of the adapter device to a positive wire of a current loop connected to a positive terminal of a communication module of the field instrument. The method also includes connecting a third wire and a fourth wire of the adapter device to a negative wire of the current loop connected to a negative terminal of the communication module of the field instrument. The method also includes disconnecting the positive wire of the current loop between the first wire and the second wire and the negative wire of the current loop between the third wire and fourth wire.

23 Claims, 6 Drawing Sheets

(56) References Cited

OTHER PUBLICATIONS

Emerson Process Management, "Smart Wireless THUM™ Adapter," Quick Installation Guide, 00825-0100-4075, Rev AA, Aug. 2009, 20 pages, publisher Rosemount Inc., Chanhassen, MN.
MACTek® Corporation, "BULLET®," WirelessHART® Adapter, Model 1101 Series, User Manual, 2011, 65 pages, publisher MACTek®, Twinsburg, OH.

* cited by examiner

WIRELESS DEVICE FOR CAPTURING STRANDED DATA ON FIELD DEVICES

TECHNICAL FIELD

This disclosure is generally directed to industrial process control and automation systems. More specifically, this disclosure is directed to connecting an adapter device to a field instrument in an industrial control system to capture stranded data on field devices.

BACKGROUND

In the process control industry, use of smart pressure, temperature and level field instruments has become commonplace, because they can be installed almost anywhere at a facility due to their compact size. For field installations utilizing wired HART devices, the wired HART device is used on a continuous process that operates on a long-term basis. Because of the continuous nature of the process, the wired HART device should not be removed from service for even a brief period, as doing so can disrupt the process and cause business losses.

SUMMARY

This disclosure provides an apparatus and method for connecting an adapter device to a field instrument in an industrial control system to provide a wireless communication capability to the field instrument.

In a first embodiment, a method is provided. The method includes coupling an adapter device to a field instrument in an industrial control system to provide a wireless communication capability to the field instrument. The method also includes connecting a first wire and a second wire of the adapter device to a positive wire of a current loop connected to a positive terminal of a communication module of the field instrument. The method also includes connecting a third wire and a fourth wire of the adapter device to a negative wire of the current loop connected to a negative terminal of the communication module of the field instrument. The method also includes disconnecting the positive wire of the current loop between the first wire and the second wire and the negative wire of the current loop between the third wire and fourth wire.

In a second embodiment, a system is provided. The system includes one or more field instruments, a marshalling panel, and an adapter device. The field instrument is in an industrial control system. The marshalling panel is coupled to the one or more field instruments. The adapter device is coupled to a communication module of each of the one or more field instruments through the marshalling panel. The adapter device is configured to provide a wireless communication capability to each of the one or more the field instruments, and receive data from each of the one or more the field instruments.

In a third embodiment, an apparatus is provided. The apparatus includes a transmitter and an interface. The transmitter is configured to communicate over a first protocol. The interface includes a positive terminal and a negative terminal. The positive terminal connected to an adapter device through a first T-splice connection and the negative terminal connected to the adapter device through a second T-splice connection.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 7, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

HART devices are connected to control systems that operate in a 4-20 mA analog mode. The control system does not provide a HART interface to the HART device. Therefore, process and diagnostic data, also referred to as stranded HART data, which is contained within the wired HART device, cannot be retrieved by the system without field service personnel physically connecting a handheld device to the HART device and manually obtaining the information.

Figure 1:
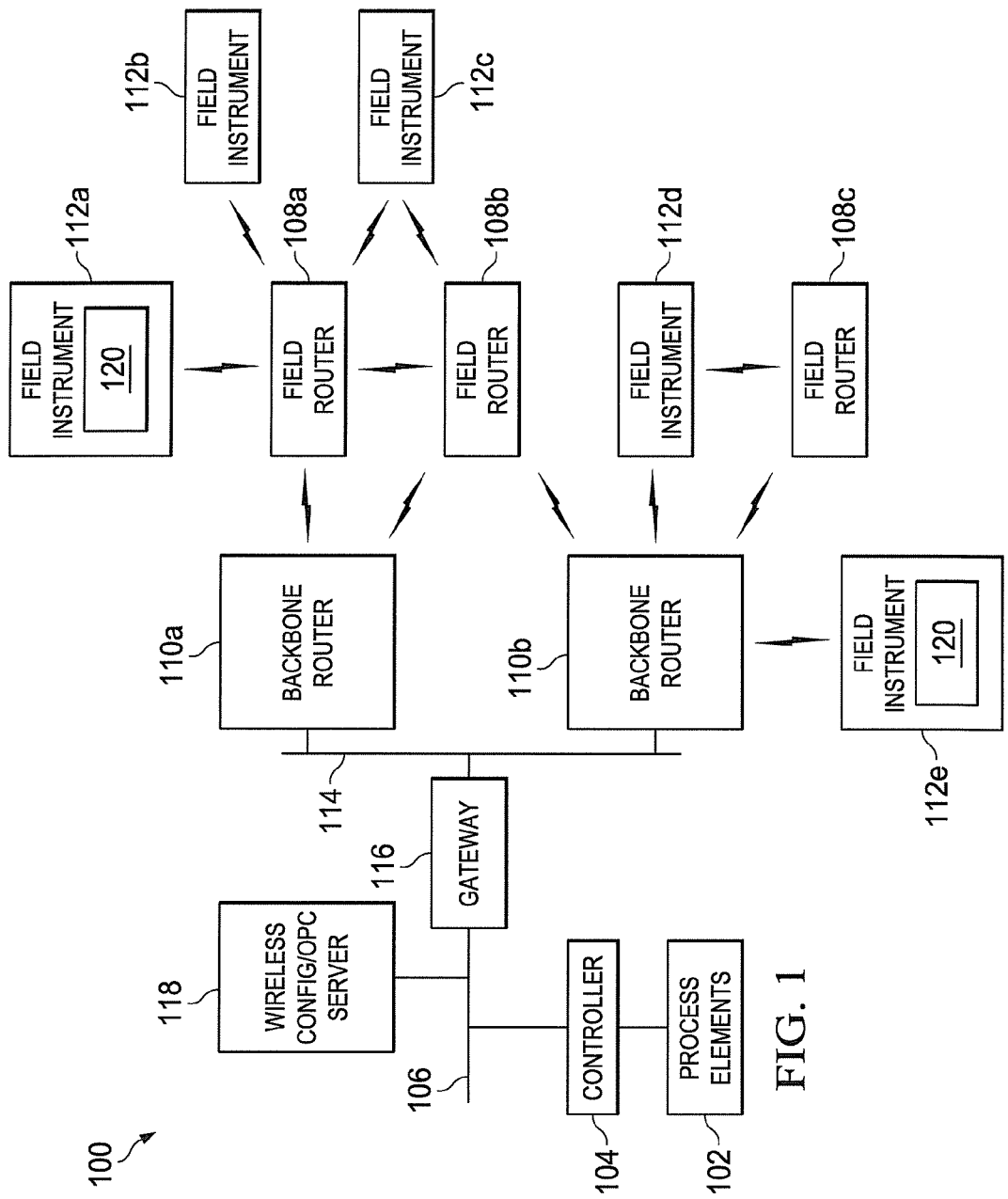
FIG. 1 illustrates an example industrial control and automation system having a field device according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing a MICROSOFT WINDOWS or suitable real-time operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks for communicating with wireless sensors or other wireless field devices. Field devices may also be referred to as field instruments. In the example shown in FIG. 1, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100.11a.

In this example, the field routers 108a-108c and backbone routers 110a-110b generally represent routing devices that store and forward messages for other devices and that are typically line-powered, meaning these devices receive operating power from external sources (such as AC supply lines). However, a field or backbone router could represent a device powered by a local power supply, such as an internal battery (referred to as locally-powered). The field instruments 112a-112e generally represent non-routing devices that are line-powered, although a field instrument could provide routing functionality or be locally-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. The backbone network 114 includes any suitable network for transporting data, such as a FAULT TOLERANT ETHERNET network, a wireless mesh network, or other wired or wireless network.

A gateway 116 couples the network 106 and the backbone network 114. The gateway 116 can perform security functions to allow only authorized traffic to flow between the networks 106 and 114. The gateway 116 can also perform translation functions to translate between protocols. The gateway 116 includes any suitable structure for providing access to networks and translating between protocols used by those networks.

A wireless configuration and OLE for Process Control (OPC) server 118 can configure and control various aspects of the system 100. For example, the server 118 could configure the operation of the field routers 108a-108c, backbone routers 110a-110b, and field instruments 112a-112e. The server 118 could also support security in the system 100, such as by distributing cryptographic keys or other security data to various wireless devices or other components. The server 118 includes any suitable structure for configuring wireless networks and providing security information.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multi-functional, plant-wide coverage for wireless sensing, asset location tracking, personnel tracking, wireless communications, and any other or additional functionality as desired.

In one aspect of operation, at least one of the field instruments 112a-112e may lack the ability to communicate over the wireless network using the appropriate wireless network protocol. For example, at least one of the field instruments 112a-112e could be a legacy field device that previously was not equipped with the specified communication capability. Alternatively, the field instrument could communicate using a Highway Addressable Remote Transducer (HART), wireless HART (W-HART), or other field instrument protocol, and the wireless network could support an ISA100.11a or other industrial wireless network protocol. To allow that field instrument to communicate over the wireless network, an adapter device 120 can be provided. An adapter device 120 communicates with an associated field instrument 112a-112e to obtain outgoing data from, or provide incoming data to, the field instrument. The adapter device 120 also wirelessly transmits the outgoing data or wirelessly receives the incoming data over the wireless network using the appropriate wireless network protocol. Additionally, the adapter device 120 can be configured to convert (i.e., translate) a protocol used by the field instrument 112a-112e into a protocol used by the wireless network. In this way, the adapter device 120 allows a HART, W-HART, or other field instrument to communicate within an ISA100.11a or other wireless network, without the need for communication and network management infrastructures supporting multiple wireless protocols.

In particular embodiments, the adapter device 120 supports the ISA100.11a communication protocol and couples to a HART or W-HART field instrument through a two-wire, 4-20 mA wired communication modem. Through this connection, the adapter device 120 is able to read HART application data from the field instrument. This data then can be transported over an ISA100.11a communication layer. All HART and W-HART devices are required to provide this interface for provisioning and handheld reader support. This functionality can be achieved through the definition of a common-practice user layer HART interface object for field instruments. The HART interface object can be contained within an ISA100.11a user application process (UAP).

In particular embodiments, the adapter device 120 receives a unique identifier associated with its associated field instrument 112a-112e. The unique identifier identifies the field instrument 112a-112e and can be used by the network to identify where on the network the field instrument 112a-112e is located. The adapter device 120 also can transmit the unique identifier along with a protocol attribute. The protocol attribute is configured to inform other devices on the wireless network which protocol the field instrument 112a-112e is using. For example, the protocol attribute could reference that the field instrument 112a-112e is a HART device. Thereafter, any device on the network needing to communicate with a HART device can determine which devices are HART devices and where the HART devices are located on the network.

A field instrument 112a-112e on a standard wired HART interface is often limited to (i) a query/response mechanism using HART-based commands and (ii) an unsolicited response mode transmission referred to as HART burst mode where the field device periodically sends process data at a predetermined update rate. These communication methods were designed and optimized for data transfer over a two-wire master/slave communication interface. The HART-based protocol did not consider transport or network services and in many cases combined the application layer features to control physical layer aspects. As a result, simply encapsulating a HART protocol into the ISA100.11a protocol does not achieve the desired addressing, efficiency, and functionality for a distributed wireless network. By using an interface object to interface a HART field instrument 112a-112e onto a wireless network, the HART field instrument 112a-112e can be provided with the necessary and standard ISA100.11a features and services for network communications. These features and services include the ability for the interface to be identified as a standard ISA100.11a addressable object with standard ISA100.11a application services of read, write, publish, subscribe, and method execution.

In some embodiments, external devices can be connected through an interface to access the interface object using ISA100.11a services to invoke specific functions exposed by a HART proxy host application executing in the adapter device. These functions can include open, send, receive, and close. The open function can instruct the HART application associated with the selected interface to prepare the HART interface for communication. This may include checking that a HART device is connected and determining the unique identifier for data transactions. The send operation can instruct the application associated with the selected interface to send a specific command to the connected HART device. The send operation could be blocking (where it waits for a response before returning) or non-blocking (where it returns with an acknowledgement that the command was successfully sent and the response can be returned by polling with a receive operation). The close operation can instruct the application associated with the selected interface to terminate communication with the field device and possibly put the interface in a low power state. By use of these exposed functions, an application running in a handheld or other device can utilize the interface object as a remote modem interface to send and receive without the need to be concerned with HART protocol features such as preambles, bus arbitration, device discovery, and other data and physical layer features. In this way, the HART protocol is not used over the interface, but instead only the HART commands and HART response data are transferred by using ISA100.11a standard services by means of the functions and attributes exposed by the interface object.

The adapter device 120 can also support an ISA100.11a object or some other object associated with a different wireless network protocol. An ISA100.11a object could provide access over the wireless network to a remote HART modem or other interface using remote methods that are implemented in the ISA100.11a object. The adapter device 120 also allows mapping of standard ISA100.11a object types (such as AI, AO, DI, and DO) to standard HART or other field instrument protocol object types (such as PV, SV, TV, and QV). This allows the object types to be published and shared amongst not only HART devices but also other devices on the ISA100.11a network using true peer-to-peer publisher-subscriber services.

Using this functionality, a rich information model that contains a converged, interoperable user layer supporting existing user layer application concepts can be used to provide a common and comprehensive information view. This approach is sufficient to support a wide variety of process control applications, such as sensing, actuation, and control in the field. Block-oriented processes that are richer and better can be used to support the view of both enterprise semantics (such as those defined by ISA100.11a) and command-oriented application processes (such as defined by HART) to meet the needs of older conventional systems via a single common user layer, application protocol, and communication stack. Because of the commonality of access, the unified user layer also promotes the deployment of simplified end-to-end analysis applications that require less programming and less conversion overhead.

In this example, only two of the field instruments 112a and 112e are associated with adapter devices 120. The adapter devices 120 could perform a range of functions for the instruments 112a and 112e, from merely reading process variable (PV) data and transmitting it wirelessly to full two-way interaction and control. The remaining field instruments 112b-112d may natively support a wireless protocol used by the wireless network and not need an adapter device 120. Note, however, that this is for illustration only.

Each adapter device 120 includes any suitable structure for coupling to a field instrument and supporting communications using a wireless protocol. Each adapter device 120 could have one of multiple form factors depending on its use. For instance, an adapter device 120 could be a separate device physically mounted on a field instrument, a separate device tethered to a field instrument by a cable or other communication link, or an integrated device within a field instrument.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where an adapter device 120 supporting field instrument communications over a wireless network can be used. This functionality could be used in any other suitable system.

Figure 2:
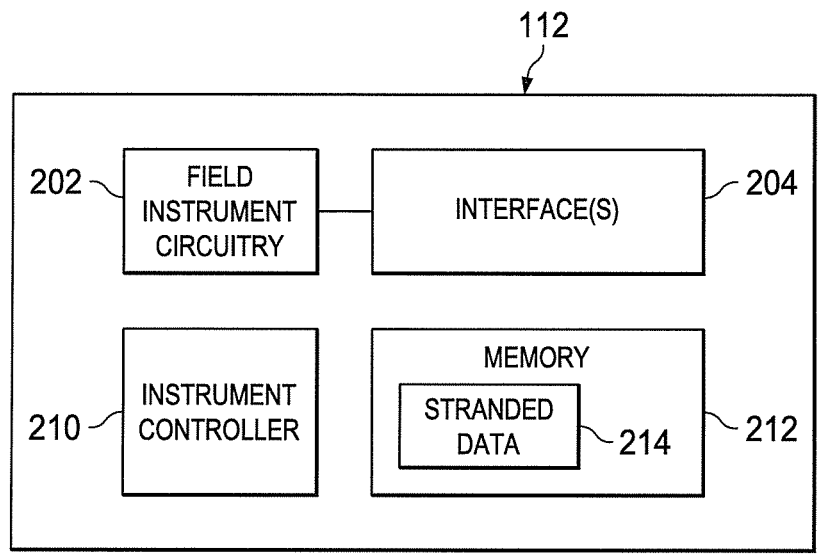
FIG. 2 illustrates an example field instrument according to this disclosure.

FIG. 2 illustrates an example field instrument 112 according to this disclosure. The field instrument 112 could be used in the system 100 of FIG. 1 or in any other suitable system.

As shown in FIG. 2, the field instrument 112 includes field instrument circuitry 202. The circuitry 202 generally performs the industrial control/automation function(s) of the field instrument 112. For example, the circuitry 202 could include sensing and signal processing circuitry within an industrial process sensor. The circuitry 202 could also include actuating circuitry for making adjustments to an industrial process within an industrial actuator. The circuitry 202 could further include processing circuitry for determining how to adjust an industrial process within a process controller. Any other or additional circuitry 202 supporting any other or additional functions could be used in the field instrument 112.

The field instrument 112 also includes at least one interface 204. The interface 204 supports communications between the field device circuitry 202 and another device coupled to the field instrument 112. The interface 204 could, for example, retrieve outgoing data to be transmitted from the circuitry 202 and provide that data to the coupled device. The interface 204 could also provide incoming data received from the coupled device to the circuitry 202. The interface 204 includes any suitable structure for supporting communications of data between components. In particular embodiments, the interface 204 could support any suitable protocol for interacting with a field instrument, such as the highway addressable remote transducer (HART) or wireless HART (W-HART). In other embodiments, the interface 204 includes a serial interface. Note that any other suitable interface(s) could be used, depending on the industrial field device protocol(s) used by the field instrument 112.

The field instrument 112 further includes a controller 210, which controls the overall operation of the instrument 112. For example, the controller 210 could control the communication of data to and from the coupled device. The controller 210 could also control the process control/automation functionality performed by the field instrument 112. In addition, the controller 210 could execute the functionality associated with HART interface objects or interface objects for other field device protocols as described below. The controller 210 includes any suitable structure for controlling operation of a field instrument. As particular examples, the controller 210 could represent a processor, microprocessor, microcontroller, field programmable gate array, digital signal processor, or other processing or control device(s).

A memory 212 is coupled to the controller 210. The memory 212 stores any of a wide variety of information used, collected, or generated by the field instrument 112. For example, the memory 212 could store information transmitted over or received from a wireless network. The memory 212 includes any suitable volatile and/or non-volatile storage and retrieval device(s).

Although FIG. 2 illustrates one example of a field instrument 112, various changes may be made to FIG. 2. For example, the field instrument 112 could include any number of each component. Also, the functional division shown in FIG. 2 is for illustration only. Various components in FIG. 2 could be combined, subdivided, or omitted and additional components could be added according to particular needs.

Figure 3:
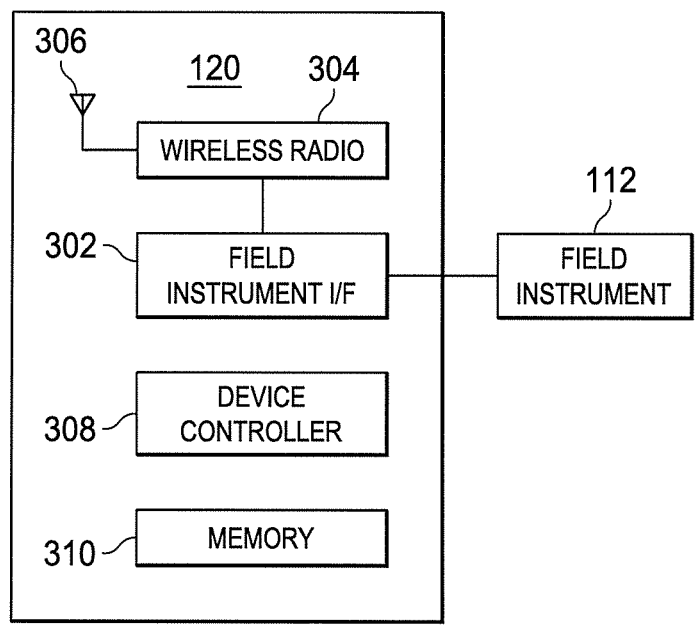
FIG. 3 illustrates an example adapter device according to this disclosure.

FIG. 3 illustrates an example adapter device 120 according to this disclosure. The adapter device 120 could be used in the industrial control and automation system 100 of FIG. 1 or in any other suitable system.

As shown in this example, the adapter device 120 includes a field instrument interface (I/F) 302. The interface 302 supports communications with at least one field instrument 112. The interface 302 could, for example, retrieve outgoing data to be transmitted wirelessly from the field instrument 112. The interface 302 could also provide incoming data received wirelessly to the field instrument 112. The interface 302 includes any suitable structure for communicating with a field instrument 112. In particular embodiments, the interface 302 includes a two-wire, 4-20 mA wired communication modem for coupling to a HART or W-HART field instrument. In other embodiments, the interface 302 includes a serial interface. Note that any other suitable interface(s) could be used, such as an inter-processor Serial Communication Interface (SCI). This can provide a way for a field instrument vendor to create a field instrument that is compatible with the HART command set and that is accessible over the ISA100.11a network, without the need for a wired HART interface. By doing so, a battery-powered wireless field instrument can be designed that supports HART commands as a basis for application data access.

A wireless radio 304 is coupled to an antenna 306. The wireless radio 304 and antenna 306 can be used to communicate wirelessly with one or more field or backbone routers in a wireless network. The wireless radio 304 supports the necessary protocol(s) for communicating over an industrial wireless network. The wireless radio 304 includes any suitable structure for providing signals for wireless transmission and/or for obtaining signals received wirelessly. The antenna 306 represents any suitable structure for transmitting and/or receiving wireless signals. In some embodiments, the wireless radio 304 represents an RF transceiver, such as an RF FHSS or DSSS transceiver. As a particular example, the wireless radio 304 could be implemented using a FREESCALE or MSP430 processor. Also, the antenna 306 could represent an RF antenna. Note that any other suitable wireless signals could be used to communicate and that the wireless radio could include a transmitter and a separate receiver.

The adapter device 120 further includes a controller 308, which controls the overall operation of the adapter device 120. For example, the controller 308 could control the communication of data to and from the field instrument 112. The controller 308 could also control the communication of data to and from the wireless radio 304. In addition, the controller 308 could execute the functionality associated with HART interface objects (or interface objects associated with other field instrument protocols) in order to support adapter or translation functionality. The controller 308 includes any suitable structure for controlling operation of an adapter device 120. As particular examples, the controller 308 could represent a processor, microprocessor, microcontroller, field programmable gate array, digital signal processor, or other processing or control device(s).

A memory 310 is coupled to the controller 308. The memory 310 stores any of a wide variety of information used, collected, or generated by the adapter device 120. For example, the memory 310 could store information received over a wireless network that is to be transmitted to a field instrument or vice versa. The memory 310 includes any suitable volatile and/or non-volatile storage and retrieval device(s).

While not shown, the adapter device 120 could include any suitable source(s) of operating power. For example, the adapter device 120 could be powered by an internal power supply, such as a battery, fuel cell, or solar cell. Instead of, or in addition to, an internal power supply, the adapter device 120 could be designed to scavenge power through the interface 302.

In some embodiments, an adapter device 120 can be integrated into a field instrument 112. In these embodiments, the components of the adapter device 120 in FIG. 3 could represent components already present in the field instrument 112, such as in the interfaces 204 of the field instrument 112. In that case, the components in the field instrument 112 could be upgraded or replaced to support the use of the appropriate interface objects and wireless network protocols.

In one aspect of operation, at least one field instrument 112 includes or is coupled to an adapter device 120 that supports (i) local configuration and monitoring of the field device; (ii) provisioning of the field device onto the wireless network; and (iii) communication of data between the field instrument and other devices through the wireless network. The adapter device 120 can support out-of-band (OOB) communications, meaning the communications occur outside of the wireless network. The adapter device 120 can also support the local update or translation of a foreign protocol for the field instrument 112, such as when the field instrument 112 is a legacy protocol device. The adapter device 120 allows a user device, such as a personal digital assistant (PDA) or other handheld/portable device, to interact with the field instrument 112 and to configure the adapter device 120 to communicate with the field instrument 112, as well as to configure and provision the field instrument 112 onto the wireless network.

In some embodiments, the adapter device 120 can be a self-contained adapter configured to couple to and to provide a communication capability, such as wireless communication capability, to a legacy field instrument 112 that previously was not equipped with the specified communication capability. For example, the adapter device 120 can be a one-wireless-adapter (OWA) that can provide a wireless communication capability to the field instrument 112. The adapter device 120 could also use any suitable technology to communicate with an external device. For instance, the adapter device 120 could include an infrared interface, a radio interface, or other wireless interface or a wired interface.

Although FIG. 3 illustrates one example of an adapter device 120, various changes may be made to FIG. 3. For example, the adapter device 120 could include any number of each component. Also, the functional divisions shown in FIG. 3 are for illustration only. Various components in FIG. 3 could be combined, subdivided, or omitted and additional components could be added according to particular needs.

Figure 4:
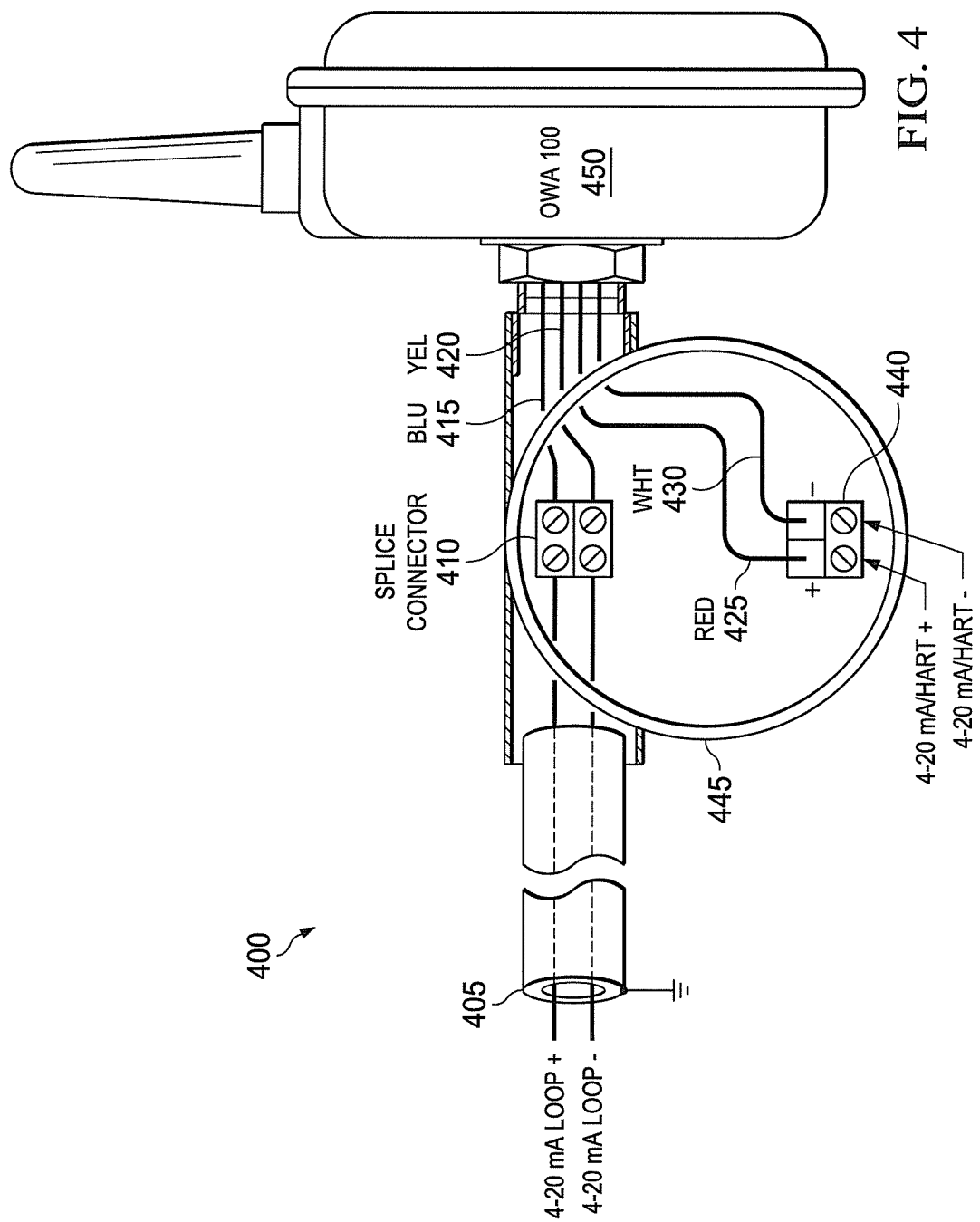
FIG. 4 illustrates an internal schematic view of a field instrument according to this disclosure.

FIG. 4 illustrates an internal schematic view of a field instrument 400 according to this disclosure. For ease of explanation, the field instrument 400 is described as being used in the system 100 of FIG. 1. For example, the field instrument 400 may represent (or be represented by) a field instrument 112a-112e as described in FIG. 1. The field instrument 400 may also be an example of field instrument 112 as described in FIG. 2. However, the field instrument 400 could be used in any other suitable system.

The field instrument 400 includes a 4-20 mA loop 405, a splice connector 410, wires 415-430, a communication module 440, and a housing 445. The field instrument 400 can also be coupled to an adapter device 450 that can provide a wireless communication capability to the field instrument 400. The field instrument 400 can be a HART device and the adapter device 450 can be a one-wireless-adapter (OWA).

The 4-20 mA loop 405 can be used for analog signaling, with 4 mA representing the lowest end of the range and 20 mA the highest. The accuracy of the signal is not affected by voltage drop in the interconnecting wiring, and the 4-20 mA loop 405 can supply operating power to the field instrument 400. The 4-20 mA loop 405 can include a positive wire (4-20 mA LOOP +) and a negative wire (4-20 mA LOOP −).

The splice connector 410 allows connection of the 4-20 mA loop 405 to the adapter device 450. Wires 415-430 can be used by the adapter device 450 to connect to the 4-20 mA loop 405 and the field instrument 400.

The communication module 440 can be connected to the 4-20 mA loop 405 for providing data as well as receiving operating power. The communication module 440 connects the 4-20 mA loop 405 to a transmitter within the field instrument 400. The communication module 440 can be one example of the interface(s) 204 as shown in FIG. 2. The communication module 440 can provide process and diagnostic data, also referred to as the stranded HART data, which is contained within the wired HART device, to other devices such as the adapter device 450.

The field instrument 400 can also include first and second end caps that secure a display module and the communication module 440 to the housing 445. The display module and the communication module 440 can be part of the field instrument circuitry, such as field instrument circuitry 202 as shown in FIG. 2. Both the first end cap and the second end cap seal the field instrument circuitry and other electrical components in the housing 445 to prevent any contaminants from entering the housing 445.

Although FIG. 4 illustrates details of an example field instrument 400, various changes may be made to FIG. 4. For example, the number(s) and type(s) of components shown in FIG. 4 are for illustration only. Also, the functional divisions of the field instrument 400 shown in FIG. 4 are for illustration only. Various components in FIG. 4 could be omitted, combined, or further subdivided and additional components could be added according to particular needs.

One or more embodiments of this disclosure recognize and take into account that there are several wireless products that can connect to a wired 4-20 mA HART device. Some examples of these adapter devices are the HONEYWELL OWA100 adapter, the EMERSON "SMART WIRELESS THUM ADAPTER" and the MACTEK CORPORATION "THE BULLET" adapter. These adapter devices can also be referred to herein as wireless devices. Each of these adapter devices receives power from the 4-20 mA loop to power internal electronics. To receive the power, an installer breaks the 4-20 mA wiring going to the wired HART device, inserts the wireless device in series with the wired HART device, and then reconnects the wiring such that the 4-20 mA loop passes through the adapter device, thus allowing it to scavenge power. Breaking the 4-20 mA wiring disrupts the 4-20 mA connection between the HART device and the control system. Receiving power through this manner can also be referred to as scavenging power.

Figure 5:
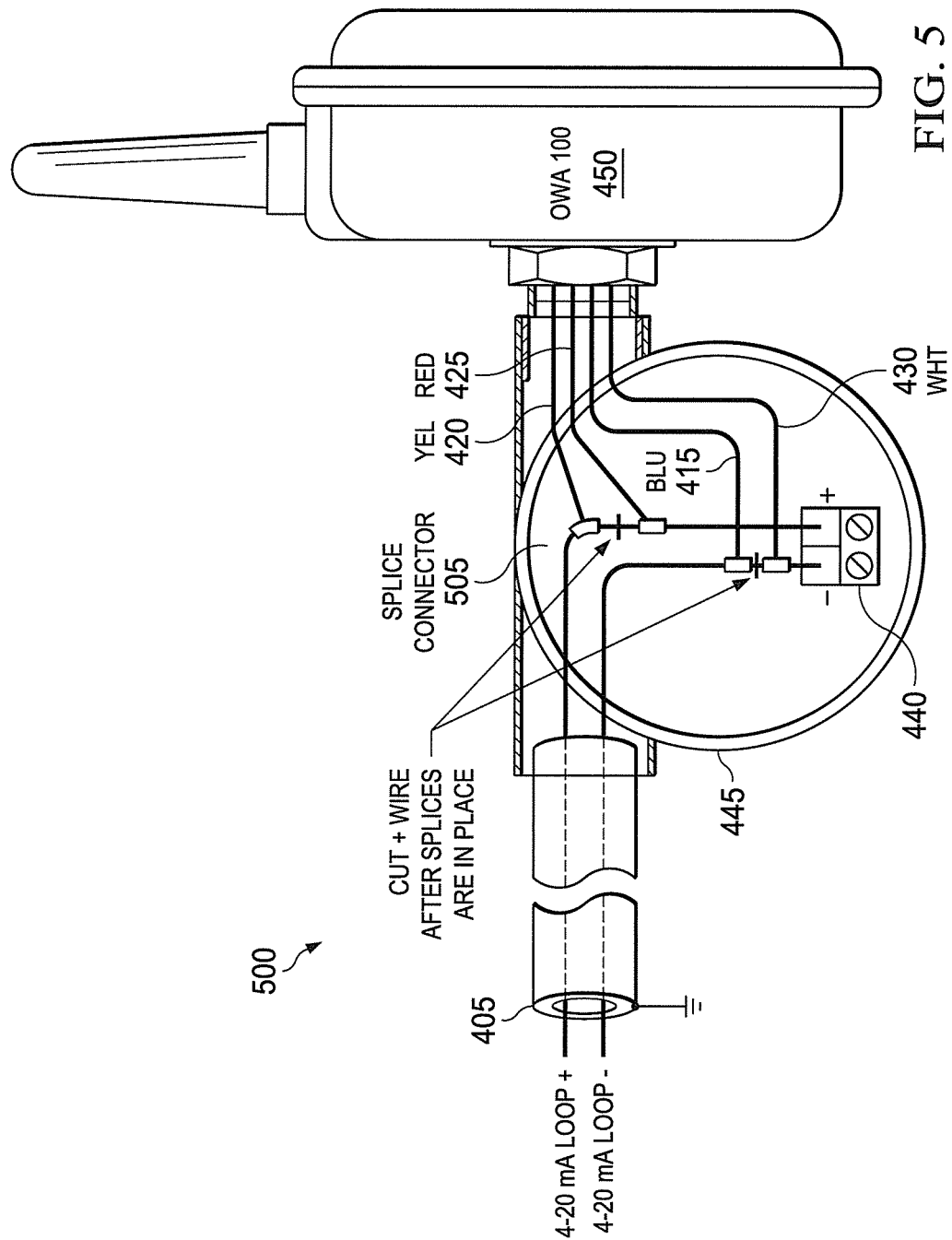
FIG. 5 illustrates an internal schematic view of another field instrument according to this disclosure.

FIG. 5 illustrates an internal schematic view of a field instrument 500 according to this disclosure. For ease of explanation, the field instrument 500 is described as being used in the system 100 of FIG. 1. For example, the field instrument 500 may represent (or be represented by) a field instrument 112a-112e as described in FIG. 1. The field instrument 500 may also be an example of the field instrument 112 as described in FIG. 2. However, the field instrument 500 could be used in any other suitable system.

The field instrument 500 includes a 4-20 mA loop 405, splice connectors 505, wires 415-430, a communication module 440, and housing 445. The field instrument 400 can also be coupled to an adapter device 450 that can provide a wireless communication capability to the field instrument 400. The field instrument 400 can be a HART device and the adapter device 450 can be a one-wireless-adapter (OWA).

In an embodiment, the negative wire (4-20 mA LOOP −) of 4-20 mA loop 405 can be directly connected to a negative terminal of the communication module 440.

The positive wire (4-20 mA LOOP +) of 4-20 mA loop 405 can be directly connected to the adapter device 450 through the wire 420. Wire 420, also referred to as a yellow wire, can be used to bring the 4-20 mA signal from a control system into the adapter device 450. Also, the positive terminal of the communication module 440 can be connected to the adapter device 450 through the wire 425. Wire 425, also referred to as a red wire, can be used to send the positive wire (4-20 mA LOOP +) of 4-20 mA loop 405 to the field instrument 500. Inside the adapter device 450, there is a circuit between the yellow and red wires. This circuit scavenges a small amount of power from the 4-20 mA loop which is then utilized to help power the rest of the circuitry inside the adapter device 450.

The negative wire (4-20 mA LOOP −) of 4-20 mA loop 405 can be directly connected to the adapter device 450 through the wire 415. Wire 415, also referred to as a blue wire, can be used to return the 4-20 mA signal to a control system from the adapter device 450. Also, the negative terminal of the communication module 440 can be connected to the adapter device 450 through the wire 430. Wire 430, also referred to as a white wire, can be used to return the negative signal of the field instrument 500 to the adapter device. Inside the adapter device 450, there is a circuit between the white and blue wires. Inside the adapter device 450 between white/blue junction and the red wire is a field instrument communications transceiver circuit that allows the adapter device 450 to transmit and receive field instrument messages to and from the field instrument 500.

In various embodiments, each of the positive wire (4-20 mA LOOP +) and negative wire (4-20 mA LOOP −) of 4-20 mA loop 405 can be connected to the wires 415-430 by a T-splice or another splicing device. Once the wires 415-430 are connected to the 4-20 mA loop, the 4-20 mA loop can be disconnected between the splices.

The communication module 440 can be connected to the 4-20 mA loop 405 and the adapter device 450 for providing data as well as receiving operating power. The communication module 400 connects the 4-20 mA loop 405 and the adapter device 450 to a transmitter within the field instrument 500. The communication module 440 can be one example of the interface(s) 204 as shown in FIG. 2. The communication module 440 can provide process and diagnostic data, also referred to as the stranded HART data, which is contained within the wired HART device, to other devices such as the adapter device 450.

The field instrument 500 can also include first and second end caps that secure a display module and the communication module 440 to the housing 445. The display module and the communication module 440 can be part of the field instrument circuitry, such as the field instrument circuitry 202 as shown in FIG. 2. Both the first end cap and the second end cap seal the field instrument circuitry and other electrical components in the housing 445 to prevent any contaminants from entering the housing 445.

Although FIG. 5 illustrates details of an example field instrument 500, various changes may be made to FIG. 5. For example, the number(s) and type(s) of components shown in FIG. 5 are for illustration only. Also, the functional divisions of the field instrument 500 shown in FIG. 5 are for illustration only. Various components in FIG. 5 could be omitted, combined, or further subdivided and additional components could be added according to particular needs.

One or more embodiments of this disclosure provide an adapter device installed by connecting to a wired HART device such that the 4-20 mA connection between the wired HART device and the control system is not disrupted. This process can be utilized by any scavenging type of wireless device. The process involves the utilization of a splice connector to a "T" connection to existing wires. The process utilizes these splices to connect wires between the adapter device and the 4-20 mA loop and then, once all splices are in place, cutting one of the 4-20 mA wires which now electrically places the adapter device in series with the 4-20 mA HART device, thus allowing it to scavenge power. The HONEYWELL OWA100 has an internal battery; therefore there are no internal circuits that need to charge before the OWA100 goes into operation. A non-battery powered adapter device needs to charge before it can work; therefore during this charging period the 4-20 mA loop may be disrupted and thus interrupt the 4-20 mA loop connection between the control system and the HART device.

Figure 6:
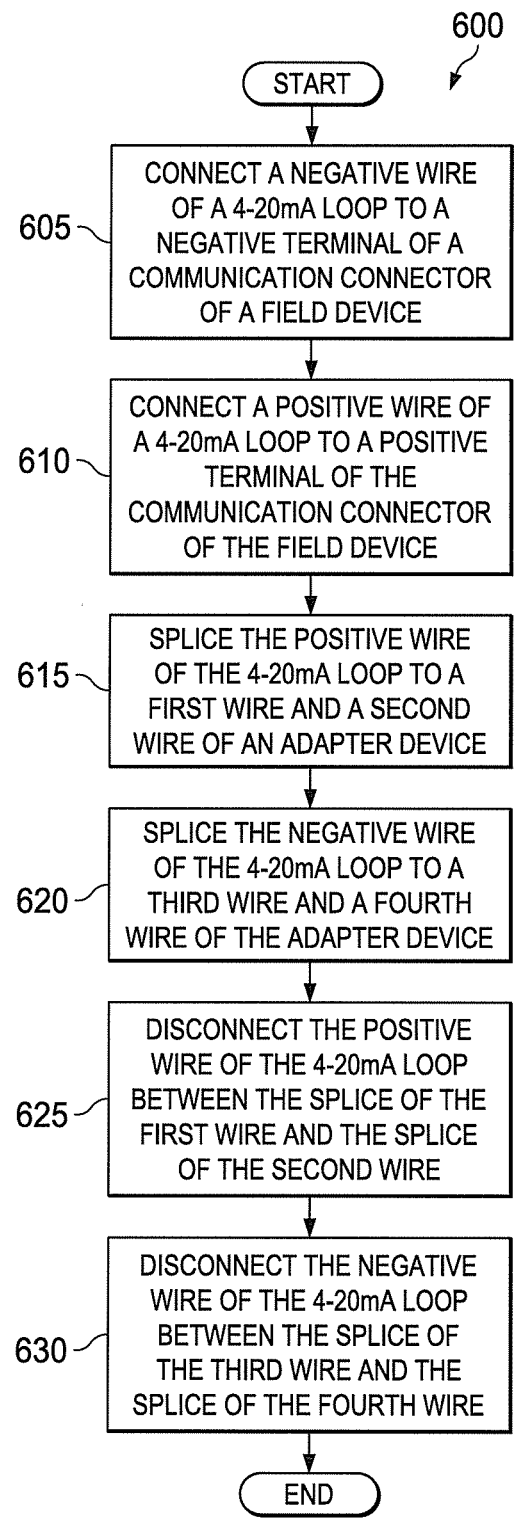
FIG. 6 illustrates an example method for connecting an adapter device to a field instrument according to this disclosure.

FIG. 6 illustrates an example method 600 for connecting an adapter device to a field instrument according to this disclosure. For ease of explanation, the method 600 is described with respect to the field instrument 112 and adapter device 120 shown in FIGS. 2 and 3. However, the method 600 could be used by any suitable field instrument or adapter device and in any suitable system.

At operation 605, connect a negative wire (4-20 mA LOOP −) of a 4-20 mA loop to a negative terminal of a communication module of a field device. In one or more embodiments, the negative wire may already be connected to the negative terminal.

At operation 610, connect the positive wire (4-20 mA LOOP +) of the 4-20 mA loop to the positive terminal of the communication module of the field device. Similar to operation 605, in one or more embodiments, the negative wire may already be connected to the positive terminal.

At operation 615, splice the positive wire (4-20 mA LOOP +) of the 4-20 mA loop to a first wire and a second wire of an adapter device. At operation 620, splice the negative wire (4-20 mA LOOP −) of a 4-20 mA loop to a third wire and a fourth wire of the adapter device. In one or more embodiments, the splicing of the first wire occurs closer to the communication module of the field instrument than the splicing of the second wire. In one or more embodiments, the splicing of the third wire occurs closer to the communication module of the field instrument than the splicing of the fourth wire. In various embodiments, the negative wire (4-20 mA LOOP −) and positive wire (4-20 mA LOOP +) of the 4-20 mA loop can each be connected to the adapter device by a T-splice or some other splicing device.

At operation 625, disconnect the positive wire (4-20 mA LOOP +) of the 4-20 mA loop between the splice of the first wire and the splice of the second wire. At operation 630, disconnect the negative wire (4-20 mA LOOP −) of the 4-20 mA loop between the splice of the third wire and the splice of the fourth wire. Once the wires are disconnected, the adapter device is part of the 4-20 mA loop and the field instrument would have received power during the entire method 600.

Although FIG. 6 illustrates one example of a method 600 for connecting an adapter device to a field instrument, various changes may be made to FIG. 6. For example, while shown as a series of steps, various steps shown in FIG. 6 could overlap, occur in parallel, or occur multiple times. Moreover, some steps could be combined or removed and additional steps could be added.

Various embodiments recognize and take into account that there is a need for an externally-powered (non-battery, non-scavenger) adapter device that does not need to be explosion-proof nor intrinsically safe.

One or more embodiments of this disclosure provide an adapter device can be installed in a non-hazardous area to capture the stranded HART data. During installation of the adapter device, the 4-20 mA connection to the control system is not disrupted. This adapter device can be powered from an external 24V supply instead of scavenger power or a battery. This eliminates the need for the end user to periodically replace batteries and as such enhances the "non-disruptive" nature of the product.

Figure 7:
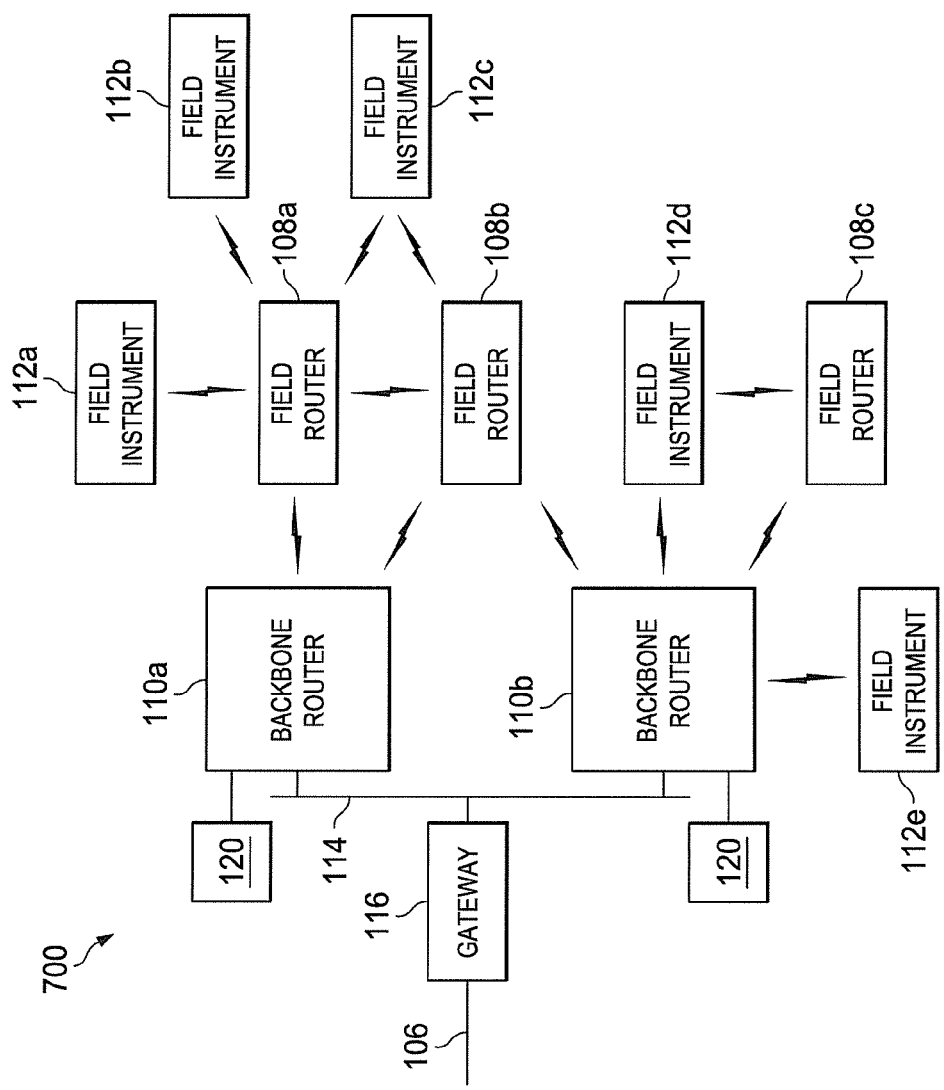
FIG. 7 illustrates an example industrial control and automation system with an adapter device according to this disclosure.

FIG. 7 illustrates an example industrial control and automation system 700 with an adapter device according to this disclosure. The system 700 is similar to system 100 as shown in FIG. 1; however the adapter devices 120 are connected to backbone routers 110a-110b instead of individual field instruments 112.

The system 700 also includes one or more industrial wireless networks for communicating with wireless sensors or other wireless field devices. In the example shown in FIG. 7, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100.11a.

In this example embodiment, the adapter devices are directly connected to backbone routers 110a-110b, however in different embodiments the backbone routers can be connected to field routers 108a-108c or a marshalling panel between field instruments 112 and either field routers 108a-108c or backbone routers 110a-110b.

A gateway 116 couples the network 106 and the backbone network 114. The gateway 116 can perform security functions to allow only authorized traffic to flow between the networks 106 and 114. The gateway 116 can also perform translation functions to translate between protocols. The gateway 116 includes any suitable structure for providing access to networks and translating between protocols used by those networks.

In one aspect of operation, at least one of the field instruments 112a-112e may lack the ability to communicate over the wireless network using the appropriate wireless network protocol. For example, at least one of the field instruments 112a-112e could be a legacy field device that previously was not equipped with the specified communication capability. Alternatively, the field instrument could communicate using a Highway Addressable Remote Transducer (HART), wireless HART (W-HART), or other field instrument protocol, and the wireless network could support an ISA100.11a or other industrial wireless network protocol.

To allow that field instrument to communicate over the wireless network, an adapter device 120 can be provided. An adapter device 120 communicates with an associated field instrument 112a-112e to obtain outgoing data from or provide incoming data to the field instrument. The adapter device 120 also wirelessly transmits the outgoing data or wirelessly receives the incoming data over the wireless network using the appropriate wireless network protocol. Additionally, the adapter device 120 can be configured to convert (i.e., translate) a protocol used by the field instrument 112a-112e into a protocol used by the wireless network. In this way, the adapter device 120 allows a HART, W-HART, or other field instrument to communicate within an ISA100.11a or other wireless network, without the need for communication and network management infrastructures supporting multiple wireless protocols.

In particular embodiments, the adapter device 120 supports the ISA100.11a communication protocol and couples to a HART or W-HART field instrument through a two-wire, 4-20 mA wired communication modem. Through this connection, the adapter device 120 is able to read HART application data from the field instrument. This data then can be transported over an ISA100.11a communication layer. All HART and W-HART devices are required to provide this interface for provisioning and handheld reader support. This functionality can be achieved through the definition of a common-practice user layer HART interface object for field instruments. The HART interface object can be contained within an ISA100.11a user application process (UAP).

The adapter devices 120 are powered by a 24V power supply from a backbone router, field router, or marshaling panel. In an example embodiment, the marshaling panel provides a 4-20 mA loop to one or more field instruments and selectively provides the signals to the adapter device 120. This embodiment allows for the adapter device 120 to be in a non-hazardous area to capture the stranded HART data does not need to be explosion-proof nor intrinsically safe.

In this methodology, the 4-20 mA signal between the control system and the field instrument is never interrupted during the installation of the adapter device and thus there is no loss of data. This adapter device does not scavenge power from the 4-20 mA loop signal.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
coupling an adapter device to a field instrument in an industrial control system to provide a wireless communication capability to the field instrument by:
connecting a first wire and a second wire of the adapter device to a positive wire of a current loop connected to a positive terminal of a communication module of the field instrument;
connecting a third wire and a fourth wire of the adapter device to a negative wire of the current loop connected to a negative terminal of the communication module of the field instrument; and
disconnecting the positive wire of the current loop between the first wire and the second wire and disconnecting the negative wire of the current loop between the third wire and fourth wire.

2. The method of claim 1, wherein the adapter device is configured to convert information from a first protocol native to the field instrument into a second protocol native to a wireless network and transmit the information to at least one other device over the wireless network.

3. The method of claim 2, further comprising:
communicatively coupling the adapter device to a user device to configure and provision the adapter device.

4. The method of claim 3, further comprising:
configuring the adapter device to communicate with the field instrument using the first protocol.

5. The method of claim 3, further comprising:
configuring the adapter device to communicate with the at least one other device over the wireless network using the second protocol.

6. The method of claim 5, wherein the adapter device is configured to receive process or diagnostic data from the field instrument.

7. The method of claim 1, wherein the negative terminal of the communication module is connected to a marshalling panel through the current loop.

8. The method of claim 2, wherein the first protocol is a Highway Addressable Remote Transducer (HART) protocol.

9. The method of claim 1, wherein the current loop is a 4-20 mA loop.

10. A system comprising:
one or more field instruments in an industrial control system;
a marshalling panel physically coupled to the one or more field instruments through a current loop; and
an adapter device physically coupled to the marshalling panel and to a communication module of each of the one or more field instruments through the marshalling panel and through the current loop, the adapter device configured to:
provide a wireless communication capability to each of the one or more field instruments, and
receive data from each of the one or more field instruments.

11. The system of claim 10, wherein the adapter device comprises:
an interface configured to communicate with at least one other device over a wireless network; and
a controller configured to:
convert information from a first protocol native to the one or more field instruments into a second protocol native to the wireless network, and
transmit, via the interface, the information to the at least one other device over the wireless network.

12. The system of claim 10, wherein the adapter device is configured to communicatively couple to a user device to configure and provision the adapter device.

13. The system of claim 10, wherein the data is process or diagnostic data.

14. The system of claim 11, wherein the adapter device is configured to send information regarding the first protocol to the at least one other device.

15. The system of claim 11, wherein the adapter device is configured to negotiate a scheduled communication with the at least one other device over the wireless network.

16. The system of claim 10, wherein the current loop is a 4-20 mA loop.

17. An apparatus comprising:
a field instrument comprising:
a transmitter configured to communicate using a specified protocol; and
an interface comprising a positive terminal and a negative terminal;
wherein the positive terminal is (i) connected to a first portion of a positive wire of a current loop and (ii) connected to a second portion of the positive wire of the current loop via a first T-splice connection, an adapter device, and a second T-splice connection; and
wherein the negative terminal is (i) connected to a first portion of a negative wire of the current loop and (ii) connected to a second portion of the negative wire of the current loop via a third T-splice connection, the adapter device, and a fourth T-splice connection,
wherein the negative terminal is connected by the current loop to a marshalling panel.

18. The apparatus of claim 17, wherein the specified protocol is a Highway Addressable Remote Transducer (HART) protocol.

19. The apparatus of claim 17, further comprising:
a controller configured to communicate process or diagnostic data through the interface to the adapter device.

20. An apparatus comprising:
an adapter device configured to be coupled to a field instrument in an industrial control system and to provide a wireless communication capability to the field instrument, the adapter device comprising:
a wireless radio configured to transmit or receive information associated with the field instrument; and
an interface configured to be coupled by a first wire and a second wire to a positive wire of a current loop connected to a positive terminal of a communication module of the field instrument, the interface also configured to be coupled by a third wire and a fourth wire to a negative wire of the current loop connected to a negative terminal of the communication module of the field instrument;
wherein the interface and the first and second wires are configured to maintain the current loop when the positive wire of the current loop is disconnected between the first and second wires; and
wherein the interface and the third and fourth wires are configured to maintain the current loop when the negative wire of the current loop is disconnected between the third and fourth wires.

21. The apparatus of claim 20, further comprising:
a controller configured to convert information between a first protocol native to the field instrument and a second protocol native to a wireless network.

22. The apparatus of claim 20, wherein the current loop is a 4-20 mA loop.

23. The apparatus of claim 17, wherein the current loop is a 4-20 mA loop.

\* \* \* \* \*